(12) United States Patent
Waznys et al.

(10) Patent No.: US 7,108,207 B2
(45) Date of Patent: Sep. 19, 2006

(54) PROCESS AND APPARATUS FOR COMMINUTING PARTICLE RUBBER

(75) Inventors: Peter J. Waznys, Centerport, NY (US); George W. Meckert, New York, NY (US); Anthony M. Cialone, Garden City, NY (US)

(73) Assignee: Lehigh Technologies, LLC, Garden City, NY (US)

( * ) Notice: Subject to any disclaimer, the term of this patent is extended or adjusted under 35 U.S.C. 154(b) by 11 days.

(21) Appl. No.: 10/973,847

(22) Filed: Oct. 26, 2004

(65) Prior Publication Data

US 2006/0086838 A1    Apr. 27, 2006

(51) Int. Cl.
*B02C 19/00* (2006.01)
(52) U.S. Cl. .................. 241/23; 241/24.17; 241/24.27; 241/65; 241/259.1; 241/261.1; 241/DIG. 31; 241/DIG. 37
(58) Field of Classification Search ........ 241/DIG. 37, 241/DIG. 31, 23, 65, 24.17, 24.27, 261.1, 241/259, 259.1, 259.2
See application file for complete search history.

(56) References Cited

U.S. PATENT DOCUMENTS

| 4,222,527 A | * | 9/1980 | Davis .......................... 241/33 |
| 4,273,294 A | * | 6/1981 | Hollely et al. ................. 241/18 |
| 5,624,078 A | * | 4/1997 | Bredbeck .................. 241/24.14 |
| 5,634,599 A | * | 6/1997 | Khais et al. ................... 241/23 |

* cited by examiner

*Primary Examiner*—Mark Rosenbaum
(74) *Attorney, Agent, or Firm*—Scully, Scott, Murphy & Presser, PC

(57) ABSTRACT

A process and apparatus for comminuting rubber particles. In this process and apparatus rubber particles at a temperature below the glass transition temperature are introduced into a comminuting device concurrent with the introduction of an inert gas coolant at a temperature below about −75° F. The rubber particles are comminuted in the comminuting device at a rate proportional to the average particle size of the introduced rubber particles to an average size within the range of crumb or powder rubber particles.

26 Claims, 1 Drawing Sheet

PROCESS AND APPARATUS FOR COMMINUTING PARTICLE RUBBER

BACKGROUND OF THE DISCLOSURE

1. Field of the Invention

The present invention is directed to a process and apparatus for comminuting particle rubber. More specifically, the present invention is directed to a process and apparatus for comminuting a used rubber particle feedstock to produce powder rubber sized particles.

2. Background of the Prior Art

The disposal of used tires and other rubber articles has long been a major environmental concern insofar as the large number of used tires overwhelm waste disposal sites. Furthermore, indiscriminate discarding of tires and other rubber articles create unsightly environmental problems. It is for this reason that processes have been developed to dispose of tires in a manner that not only eliminates them as an environmental problem but provides incentives for commercialization of tire disposal processes.

Independent of the process employed most such processes includes the step of rubber comminution in which rubber particles of relatively large size are reduced to sizes that can be reused in new rubber articles including new vehicle tires. These commercially useful used rubber grades include crumb and powder rubber.

Rubber comminution processes and apparatus must overcome an inherent physical property characteristics of rubber, its high degree of elasticity. Thus, rubber, at ambient conditions, is very difficult to comminute. In order to overcome this difficulty processes and apparatus have been developed to reduce the temperature of the rubber to reduce its elasticity. To obtain fine particle sized rubber it is often required to reduce rubber particles to below its glass transition temperature. At temperatured below the glass transition temperature the rubber becomes a brittle vitreous material.

Although processes and apparatus for comminuting rubber are known in the art wherein the rubber particles are chilled to below the glass transition temperature, problems associated with comminuting rubber are still present in such processes and apparatus. One of the problems associated with comminuting rubber is the temperature rise associated with this activity. Thus, the rubber may be at its glass transition temperature upon entering the comminuting apparatus but, due to frictional forces during comminution, the temperature of the rubber rises above the glass transition temperature resulting in the re-emergence of elastic properties which prevents complete comminuting efficiency.

Another problem associated with processes and apparatus for comminuting rubber in the prior art is the variability of the rubber employed. That is, the rubber particles entering a mill are not homogeneous. Rubber particle lots may vary in average particle size and other physical characteristics requiring variation in comminution to produce a uniform powder rubber particle size.

As stated above, the prior art discloses processes and apparatus for comminuting rubber particles. Among the more pertinent of these disclosures is U.S. Pat. No. 5,588,600. The '600 patent describes a process and apparatus for low temperature comminution of tires in which cryogenic fluids, employed in embrittling rubber particles so that comminution can effectively occur, is recycled. This process produces crumb and powder rubber of sufficiently small particle size useful in the production of new vehicle tires and other rubber products.

U.S. Pat. Nos. 5,368,240 and 4,863,106 describe processes and apparatus for reducing rubber to fine particle sizes. Although both of these disclosures describe processes for producing fine-sized rubber using cryogenic fluids, neither of these references disclose means for custom designing the particle size range of the product to enhance commercial reliability of those processes.

The disclosure of a grinding means in U.S. patent application Ser. No. 10/714,782, filed Nov. 17, 2003, assigned to the assignee of the present application, which application is incorporated wherein by reference, discloses a grinding means which overcomes some of the problems associated with the prior art comminution of rubber particles. However, even that grinding means, denoted in the aforementioned application at 20, does not overcome some of the problems associated in the prior art with grinding processes and apparatus.

The above remarks establish the need in the art for a new process and apparatus for comminuting rubber particles to produce commercially viable powder rubber. Such a process and apparatus is necessary to overcome problems associated with rising temperatures in the comminuting processes and apparatus of the prior art and better accommodates production of these products in spite of varying rubber particle size feedstocks.

BRIEF SUMMARY OF THE INVENTION

A process and apparatus has now been developed which provides comminution of rubber particles to better accommodate varying rubber particle size feedstocks and overcomes problems associated with rising temperatures during comminution.

In accordance with the present invention a process for comminuting preprocessed rubber particles, to produce powder sized rubber, is provided. The process of the present invention provides for introduction of preprocessed rubber particles at a temperature below the glass transition temperature. This introduction is concurrent with the introduction of the rubber particles in a comminution device wherein particles are comminuted by impact between an outer casing and an inner impact rotor, the rotor rotatable at variable speed, proportional to the introduced preprocessed feedstocks average particle size.

In further accordance with the present invention an apparatus for comminuting rubber particles is provided. The apparatus includes means for introducing a preprocessed feedstock of rubber particles, means for introducing an inert gas at a temperature no higher than about −100° F. and means for comminuting the rubber particles to a particle size range within the meaning of powder rubber.

BRIEF SUMMARY OF THE DRAWINGS

The present invention may be better understood by reference to the accompanying drawings of which.

DETAILED DESCRIPTION

Figure 2:
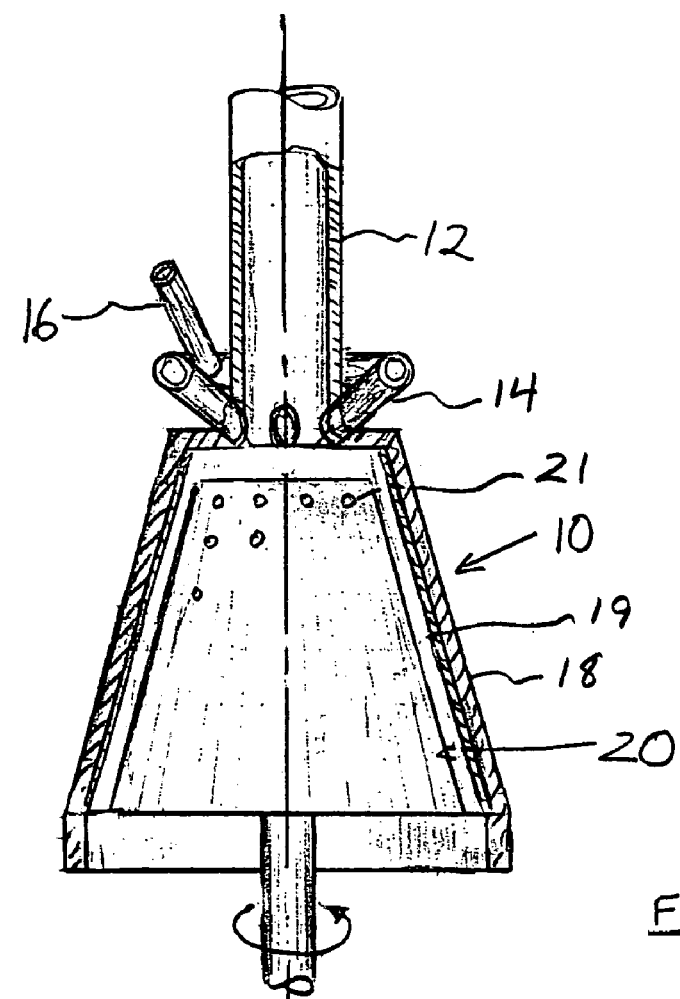
FIG. 2 is a cross-sectional view taken along plane 1—1 of FIG. 1.
Figure 1:
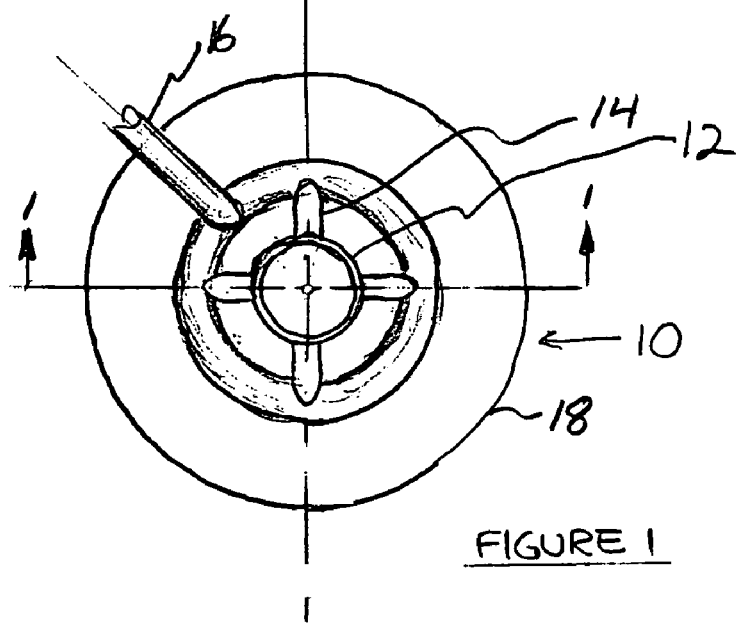
FIG. 1 is a plan view of the comminuting apparatus of the present invention.

The process and apparatus of the present invention includes the comminution of preprocessed rubber particle feedstock. Preprocessed rubber particle feedstocks are provided by processors who comminute used rubber articles, principally vehicle tires, to relatively large particle size, which cannot be used in the fabrication of new rubber products, such as vehicle tires. These preprocessed feedstocks are substantially, but not completely, free of contaminants included in the used rubber article. Thus, the rubber contains small amounts of iron-containing and fiber-containing materials.

These preprocessed rubber particle feedstocks are introduced into a comminuting device as frozen rubber particles. Specifically, the rubber particles having an average particle size in the range between about −3/8 inch and about +40 mesh are introduced into the comminuting device at a temperature below the glass transition temperature. The glass transition temperature is a physical property of a polymeric material. Rubber is usually a thermosetting polymer although there are thermoplastic rubbers. Each rubber thus has an associated glass transition temperature. That temperature is the temperature below which the rubber is a brittle vitreous solid having no elasticity.

The introduction of the rubber particle feedstock is accompanied by the concurrent introduction of a cryogenic inert gas. This inert gas coolant is introduced into the comminution device at a temperature no higher than about −90° F. Preferably, the temperature of the feedstock is in the range of between about −90° F. and about −125° F. More preferably, the temperature of the entering feedstock is in the range of between about −95° F. and about −115° F. Still more preferably, the temperature of the feedstock is about −100° F.

The inert gas is any gas that does not chemically react with the rubber particles of the feedstock. Any of the noble gases, such as neon, argon and helium, may be employed in this application. However, nitrogen, which also does not react with rubber, is particularly preferred since it is easily available and at lower cost than any of the noble gases.

It is emphasized that the feedstock and cryogenic inert gas streams are introduced into the comminuting device concurrently and usually cocurrently.

The purpose of the introduction of a cold inert gas into the comminuting device is to maintain the temperature of the rubber particle feedstock below the glass transition temperature. Although the feedstock is introduced into the comminution device at a temperature below the glass transition temperature, the energy of comminution generates heat which raises the temperature of the rubber particles. Furthermore, the decreased size of the comminuted particles enhance the transfer of this heat to the particles since smaller particles have greater surface area per unit volume. Therefore, the introduction of the cold inert gas counteracts this phenomenon and increases the efficiency of the comminution operation.

The comminution device employed in the present invention provides the flexibility of insuring the production of an average particle size within the range of what those skilled in the art characterized as powder rubber. Powder rubber is defined as rubber particles that pass through a U.S. Sieve No. 80, e.g. 80 mesh.

This powder rubber product is obtainable independent of variation in the average particle size of the rubber particle feedstock. This is possible because the process and apparatus of the present invention is provided with means to increase or decrease the degree of comminution as a function of the average rubber particle feedstock size.

This aspect of the present invention will be better understood by a description of the comminution device 10. That device includes rubber particle introduction means, in the form of a conduit 12. It is emphasized that cold inert gas is introduced into the comminution device 10 concurrently and also cocurrently with the rubber particle feedstock through conduit 12. It is indeed within the contemplation of the present invention that, instead of or in addition to the introduction of cold inert gas, which is preferably nitrogen, that a cryogenic liquid, which is the same element as the inert gas, and again is preferably nitrogen liquid, may be introduced into the device 10 through conduit 12.

The device 10 is provided with gaseous introduction means, in the form of nozzles 14. In a preferred embodiment nozzles 14 are fed by an annular manifold 15, which, in turn, is fed by an cold inert gas inlet conduit 16. Thus, an aspect of the present invention is the supply of coolant, usually in the form of an inert gas, in two steams. This second source of inert gas is provided concurrently with the introduction of feedstock and coolant through conduit 12. It should be appreciated that the temperature recited above for the coolant inert gas is the average temperature of the two streams with the proviso that each of the two streams.

The volumetric flow rate and temperature of the coolant streams are controllable. As such, control of these two variables provides a means of adjusting the comminution rate as a function of the average particle size and glass transition temperature of the feedstock.

The inert gas introduction means are connected to or integral with an outer stationary casing 18. Preferably, this casing 18 is conically shaped. Disposed within the casing 18 is an impact rotor 20. The impact rotor 20 is provided with a variable frequency drive so that its rotational speed is variable.

The impact rotor 20, accommodated in the casing 18, is also preferably conically shaped and is provided with a multiplicity of impact blades 21. The rubber particle feedstock enters the comminution device 10 through conduit 12 and is accommodated in a gap 19. Gap 19 is the annular space between the outer casing 18 and the impact rotor 20. The casing 18 may be manually adjusted up or down to adjust the width of the gap 19. The greater the width of the gap the lesser the degree of comminution and visa versa.

The degree of comminution is also controlled to greater or lesser degree by the rotational speed of the rotor 20. The greater the speed, the greater the degree of comminution.

The particles are comminuted between the stationary casing 18 and the plurality of blades 21 provided on rotor 20.

The above description and preferred embodiments are given to illustrate the scope and spirit of the present application. This description and preferred embodiments will make apparent, to those skilled in the art, other embodiments and examples. These other embodiments and examples are within the contemplation of the present invention. Therefore, the present invention should be limited only by the appended claims.

What is claimed is:

1. A process of comminuting rubber particles comprising:
    (a) introducing rubber particles, at a temperature below the glass transition temperature, into a comminuting device;
    (b) concurrently introducing an inert gas coolant into said comminuting device at an average overall temperature no higher than about −100° F.; and
    (c) comminuting said rubber particles, by impact of said rubber particles in a variable gap, said variable gap being an adjustable width between a stationary outer casing and rotating impact blades disposed on a variable rotational speed rotor, at to a comminuted average particle size within the range of powder rubber particles.

2. A process in accordance with claim 1 wherein said inert coolant is introduced into said comminuting device at an average overall temperature in the range of between about −90° F. and about −125° F.

3. A process in accordance with claim 1 wherein said inert gas coolant is introduced into said comminuting device in two separate streams.

4. A process in accordance with claim 3 wherein said first inert gas coolant stream is introduced with said rubber particles and said second inert gas coolant stream is introduced through nozzles provided on said comminuting device.

5. A process in accordance with claim 3 wherein a first stream of said inert gas coolant is introduced with said rubber particles and a second stream of said inert gas coolant is introduced separately from said rubber particles into said comminuting device.

6. A process in accordance with claim 1 wherein said rubber particles introduced into said comminuting device have an average particle size in the range of between about −3/8 inch and about 40 mesh.

7. A process in accordance with claim 1 wherein said comminuted powder rubber has an average particle size no greater than about 80 mesh.

8. A process in accordance with claim 1 wherein said comminuting rate is varied by varying the volumetric rate of introduction of said inert gas coolant.

9. A process in accordance with claim 1 wherein said comminuting rate is varied by varying the average temperature of said inert gas coolant.

10. A process in accordance with claim 1 wherein said comminution rate is varied by varying said adjustable width between said stationary casing and said impact rotor.

11. A process in accordance with claim 1 wherein said comminution rate is varied by varying the rotational velocity of said rotor.

12. A process in accordance with claim 1 comprising introducing a cryogenic liquid into said comminuting device.

13. A process in accordance with claim 1 wherein said inert gas coolant is gaseous nitrogen.

14. A process of comminuting rubber particles comprising:
    introducing a rubber particle feedstock, having an average particle size in the range of between about −3/8 inch and about 40 mesh, at a temperature below the glass transition temperature of the feedstock, into an impact mill;
    introducing, concurrently with the introduction of said rubber particle feedstock, a coolant fluid selected from the group consisting of liquid nitrogen, gaseous nitrogen at a temperature in the range of between about −95° F. and about −115° F. and mixtures thereof into said impact mill;
    separately introducing gaseous nitrogen, at a temperature below ambient, into said impact mill; and
    comminuting said rubber particle feedstock by impact in a variable gap provided between a variable rotational speed rotor, provided with a plurality of blades, and a stationary conically shaped casing wherein powder rubber having an average particle size in the range of between about 80 mesh and about 200 mesh is provided.

15. An apparatus for comminuting rubber particles comprising:
    means for introducing rubber particles, at a temperature below the glass transition temperature, into a comminution device;
    means for concurrently introducing an inert gas coolant into said comminution device at an average overall temperature no higher than about −100° F.; and
    a comminuting device provided with a variable gap between a stationary outer casing and a variable rotational speed impact rotor provided with a plurality of impact blades wherein said rubber particles are comminuted by the impact of said rubber particles between said impact blades and said stationary casing to an average size within the range of powder rubber sized particles.

16. An apparatus in accordance with claim 15 wherein said inert gas coolant is introduced into said comminuting device at an average overall temperature in the range of between about −90° F. and about −125° F.

17. An apparatus in accordance with claim 16 wherein said means for introducing inert gas coolant into said comminuting device comprises a first means for introducing an inert gas into said comminuting means and a second means for introducing an inert gas into said comminuting means.

18. An apparatus in accordance with claim 15 wherein said rubber particles provided by said introducing means have an average particle size in the range of between about −3/8 inch and about 40 mesh.

19. An apparatus in accordance with claim 15 wherein said comminuting device produces powder rubber having an average particle size in the range of between about 80 mesh and about 200 mesh.

20. An apparatus in accordance with claim 15 wherein said comminuting device comminutes said rubber particles as a function of the volumetric rate of introduction of said inert gas coolant into said comminuting device.

21. An apparatus in accordance with claim 15 wherein said comminuting device comminutes said rubber particles as a function of the average temperature of said inert gas coolant.

22. An apparatus in accordance with claim 15 wherein said rate of comminution in said communition device varies as a function of said variable gap width between said impact rotor and said stationary casing.

23. An apparatus in accordance with claim 15 wherein said comminution device rate of comminution varies as a function of the rotational speed of said impact rotor.

24. An apparatus in accordance with claim 15 comprising means for introducing a cryogenic liquid into said comminuting device.

25. An apparatus in accordance with claim 15 wherein said inert gas coolant is gaseous nitrogen.

26. An apparatus for comminuting rubber particles comprising:
- means for introducing a rubber particle feedstock, having an average particle size in the range of between about $-\frac{3}{8}$ inch and about 40 mesh, at a temperature below the glass transition temperature of said rubber particles into an impact mill;
- means for introducing, with said rubber particle feedstock, a coolant fluid selected from the group consisting of liquid nitrogen, gaseous nitrogen at a temperature in the range of between about $-95°$ F. and about $-115°$ F. and mixtures thereof into said impact mill;
- means for separately introducing gaseous nitrogen, at a temperature below ambient, into said impact mill; and
- said impact mill is provided with a variable gap between a stationary conically shaped casing and a variable rotational speed conically shaped rotor for comminuting said rubber particle feedstock therebetween to an average particle size in the range of between about 80 mesh and about 200 mesh.

\* \* \* \* \*